United States Patent
Hwang et al.

(10) Patent No.: US 10,378,482 B2
(45) Date of Patent: Aug. 13, 2019

(54) IGNITION SAFETY DEVICE FOR ROCKET MOTOR

(71) Applicant: AGENCY FOR DEFENSE DEVELOPMENT, Daejeon (KR)

(72) Inventors: Jungmin Hwang, Daejeon (KR); Seunggyo Jang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/132,856

(22) Filed: Sep. 17, 2018

(65) Prior Publication Data

US 2019/0120175 A1 Apr. 25, 2019

(30) Foreign Application Priority Data

Oct. 20, 2017 (KR) .......................... 10-2017-0136820

(51) Int. Cl.
*F02K 9/38* (2006.01)
*F02K 9/95* (2006.01)

(52) U.S. Cl.
CPC . *F02K 9/38* (2013.01); *F02K 9/95* (2013.01)

(58) Field of Classification Search
CPC ...... F02K 9/38; F02K 9/95; F42B 3/10; F42B 3/14; F42C 19/0819; F42C 19/12
USPC ....... 102/200, 202, 202.5, 202.8, 202.9, 380
See application file for complete search history.

(56) References Cited

U.S. PATENT DOCUMENTS 4,103,619 A * 8/1978 Fletcher .................. F42B 3/185
102/202.5
9,329,011 B1 5/2016 Smith

FOREIGN PATENT DOCUMENTS

| KR | 10-2000-0038951 A | 7/2000 |
| KR | 10-2011-0010915 A | 2/2011 |
| KR | 10-01710455 B1 | 2/2017 |
| KR | 10-01778168 B1 | 9/2017 |

OTHER PUBLICATIONS

Korean Office Action dated Nov. 13, 2017 issued in KR 10-2017-0136820.
Notice of Accelerated Examination Decision dated Oct. 30, 2017 issued in KR 10-2017-0136820.

* cited by examiner

*Primary Examiner* — Bret Hayes
(74) *Attorney, Agent, or Firm* — Scully Scott Murphy and Presser

(57) ABSTRACT

Provided is an ignition safety device for a rocket motor. The device includes an ignition circuit part including a main body and a control unit configured to generate an initiation signal on the basis of a specific signal, and an initiation part mounted at one end of the ignition circuit part and including at least one high voltage initiator electrically connected to the ignition circuit part. The initiation part includes a housing having at least one reception space for receiving the at least one high voltage initiator, and the housing and the main body are coupled by welding.

4 Claims, 3 Drawing Sheets

IGNITION SAFETY DEVICE FOR ROCKET MOTOR

CROSS-REFERENCE TO RELATED APPLICATION

Pursuant to 35 U.S.C. § 119(a), this application claims the benefit of earlier filing date and right of priority to Korean Application No. 10-2017-0136820, filed on Oct. 20, 2017, the contents of which is incorporated by reference herein in its entirety.

BACKGROUND OF THE INVENTION

1. Field of the Invention

The present invention relates to an ignition safety device for a rocket motor using a high voltage initiator.

2. Background of the Invention

An ignition safety device is a device for preventing accidental ignition from external threats such as static electricity or EMI, and firing missile guns when the required input conditions are satisfied according to the planned launch sequence.

The ignition safety device may be divided into safety state, armingstate, and ignition state according to the operating state. The safety state is that when a general initiator is applied in a state where any power is not supplied to an ignition safety device, although it is electrically shorted and also the general initiator is accidentally ignited, a mechanical barrier is installed to prevent ignition energy from being emitted to the outside.

The armingstate means a state where a mechanical barrier may be removed by an electric signal supplied from the outside or may be easily removed by the operation of an initiator and is a state where in the case of a general initiator, the electrical short circuit is released so that ignition power may be supplied from the outside. Finally, the ignition state means that an initiation signal is supplied in the armingstate so that a built-in initiator operates, and high-temperature and high-pressure gas, i.e., ignition energy, is discharged to the outside of an ignition safety device.

The ignition safety device is classified into electromechanical, electromechanical and electronic types according to a loading manner. The electronic ignition safety device does not use a driver such as a solenoid or torque motor for loading and there is no mechanical barrier. In relation to an operation of a conventional electronic ignition safety device, by an externally supplied loading signal, a high voltage of 1000 V or more is charged in a capacitor of the internal circuit board of the ignition safety device. When the initiation signal is applied, the high voltage charged in the capacitor is applied to a Low Energy Exploding Foil Initiator (LEEFI) to be ignited. When the shock wave generated by the ignition of the LEEFI is transmitted through the partition wall of a Through Bulkhead Initiator (TBI), the acceptor explosive and output ignition powder of TBI are sequentially ignited so that finally, high-temperature and high-pressure combustion gases are generated outside the ignition safety device.

The ignition safety device is equipped with the LEEFI for ignition. In relation to the LEEFI, when a high voltage of 1000 V or more is applied to a metal foil bridge, a bridge portion where the cross-sectional area of the foil becomes smaller is melted and vaporized, and then plasmaized. When a thin poly-imide film is attached on such a foil, polyimide film pieces on the bridges are scattered with the plasma.

When a secondary gunpowder such as Hexanitrostilbene (HNS)-IV is installed adjacent to the metal foil and the polyimide film having such characteristics, the scattered polyimide film pieces hit the solidified gunpowder and detonate the secondary gunpowder.

Such an LEEFI has the inconvenience of certainly connecting and using a special high-voltage generator but it is possible to minimize the interference by electrical noise, drift voltage, and electromagnetic waves, so that the LEEFI may be also classified as a very safe and insensitive initiator.

Since most LEEFIs are used at the end stage of their mission, a detonation phenomenon using high explosives such as HNS is required. Thus, a typical LEEFI performs detonation during operation and the housing is destroyed so that it may not maintain the shape prior to operation.

However, when using an LEEFI for a rocket motor, since the rocket motor should withstand the combustion pressure during combustion after the operation of the initiator, a housing that may withstand the detonation of the LEEFI is needed, and the combustion gas of the propelling engine flows out through the assembly part of the initiator and is exposed to high-temperature and high-pressure, so that there is a problem that the propulsion system is immediately detonated. Therefore, a TBI was conceived to confine the combustion gases of the propulsion system. However, the TBI may maintain the air tightness of the igniter during detonation.

The electronic circuit inside the ignition safety device is damaged by the ignition of the LEEFI, thereby making it impossible to check the ignition safety device in the future. Also, when the ignition circuit is momentarily short-circuited by the ignition of the LEEFI, it may cause an overcurrent to flow to a launch control system that supplies power.

In such a manner, an existing ignition safety device has a space limitation that the housing of the ignition safety device and the TBI should be designed as an integral and safe structure in order for the air tightness maintenance function.

SUMMARY OF THE INVENTION

Therefore, an aspect of the detailed description is to provide an ignition safety device capable of improving structural safety and reducing its size, weight, and shape.

To achieve these and other advantages and in accordance with the purpose of this specification, as embodied and broadly described herein, there is provided ignition safety device for a rocket motor including: an ignition circuit part including a main body and a control unit configured to generate an initiation signal on the basis of a specific signal; and an initiation part mounted at one end of the ignition circuit part and including at least one high voltage initiator electrically connected to the ignition circuit part, wherein the initiation part includes a housing having at least one reception space for receiving the at least one high voltage initiator, wherein the housing and the main body are coupled by welding.

The high voltage initiator may be received at one end of the housing coupled to the main body, and the housing may further include at least one inner hole corresponding to the high voltage initiator.

The device may further include an O-ring disposed at an inner surface of the housing constituting the reception space and an inner surface of the high voltage initiator to prevent fluid movement, and a recess area for inserting the O-ring may be disposed at an outer surface of the high voltage initiator.

When a plurality of high voltage initiators are received in the housing, the plurality of reception spaces may be disposed apart from each other to store the plurality of high voltage initiators.

The housing may be formed of aluminum (Al).

There is also provided an ignition safety device including: an ignition circuit part; a high voltage initiator electrically connected to the ignition circuit part; and at least one electric line configured to electrically connect the ignition circuit part and the high voltage initiator, wherein the ignition circuit part and the high voltage initiator are separate modules.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, an electromechanical ignition safety device of the present invention will be explained in more detail with reference to the attached drawings. For the sake of brief description with reference to the drawings, the same or equivalent components will be provided with the same reference numbers, and description thereof will not be repeated. A singular expression in the specification includes a plural meaning unless it is contextually definitely represented.

In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

Figure 1:
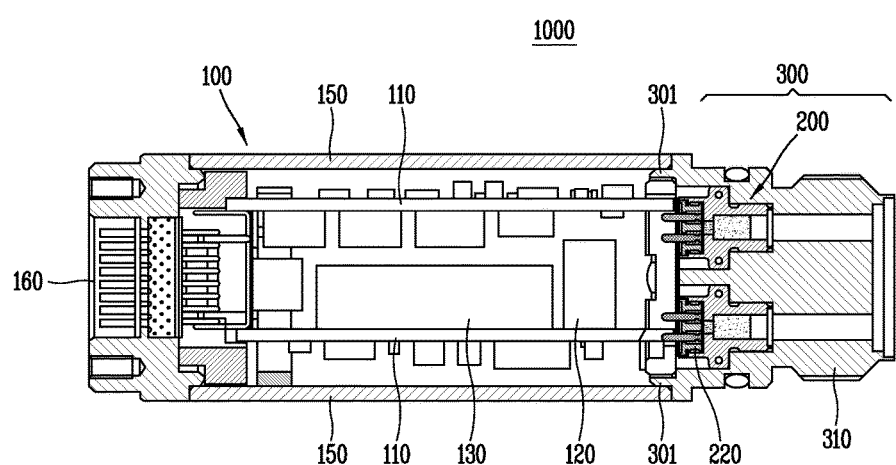
FIG. 1 is a cross-sectional view illustrating an electromechanical ignition safety device of the present invention.

FIG. 1 is a cross-sectional view illustrating an electromechanical ignition safety device of the present invention.

Referring to FIG. 1, an electronic ignition safety device 1000 includes an ignition circuit part 100 and an initiation part 300. The initiation part 300 is mounted on one end of the ignition circuit part 100. The initiation part 300 includes at least one high voltage initiator 200 disposed within the housing 310. One end of the housing 310 includes a fixing structure 301 for fixing with the ignition circuit part 100. The fixing structure 301 may correspond to a protruding structure to be welded to the main body 150 of the ignition safety device 1000.

The ignition circuit part 100 includes a main body 150, a control unit 110, a capacitor 120, and an acceleration switch 130.

The main body 150 is a component constituting the external appearance of the ignition safety device 1000 according to the present invention, and is formed in a cylindrical shape in this embodiment. The control unit 110, the capacitor 120, and the acceleration switch 130 described above may be mounted in the main body 150. Specifically, they may be mounted on a PCB substrate or implemented as a circuit on a PCB and mounted in a form of being fixed at the inner wall of the main body 150.

The control unit 110 functions to control the operation of the ignition safety device 1000 according to the present invention. Specifically, an operation signal outputted by the acceleration switch 130 and a launch signal applied by the guidance and control device are received, and an initiation signal, i.e., an electric signal, is outputted to the initiation part 300.

In this embodiment, the control unit 110 is composed of an electric circuit formed on a printed circuit board (PCB) in order to achieve miniaturization of the device. When the initiation signal is transmitted by the control unit 110, in order to output an electric signal in the form required for an operation of the high voltage initiator 200 of the initiation part 300, the capacitor 120 functions to store and supply electric power. As the DC power source and the capacitor 120 are connected by a loading signal, the capacitor 120 is charged. When the operation signal of the acceleration switch 130 and the lunch signal by the guidance and control device are inputted to the control unit 110 in a charging state, the capacitor 120 is discharged by the control unit 110 to generate an initiation signal. In this embodiment, the capacitor 120 may be mounted on the PCB including the control unit 110 thereby connecting the control unit 110 and the electric circuit. In addition, the capacitor 120 may also be configured to be charged to a high voltage sufficient to act as an initiation signal to be transmitted to a high voltage initiator 200, as described below.

The acceleration switch 130 is a component for sensing the acceleration of a rocket and outputting an operation signal to the control unit 110. The high voltage initiator 200 is a component for receiving an initiation signal outputted from the control unit 110 and igniting the rocket.

A connector 160 may be installed at the other end of the main body 150 of the ignition safety device 1000 according to the present invention. The connector 160 may serve to supply power to the control unit 110, the capacitor 120, and the acceleration switch 130, which are components mounted in the main body 150. Also, the connector 160 may serve to transmit the loading signal or the lunch signal of the rocket applied by the guidance and control device to the inside of the ignition safety device 1000 according to the present invention.

The initiation part 300 is installed at one end of the main body 150 over the interior and the exterior. The high voltage initiator 200 of the initiation part 300 receives an initiation signal from the control unit 110 and the capacitor 120 mounted inside the main body 150 and initiates the combustion reaction of the propulsion engine outside the main body 150.

Figure 2A:
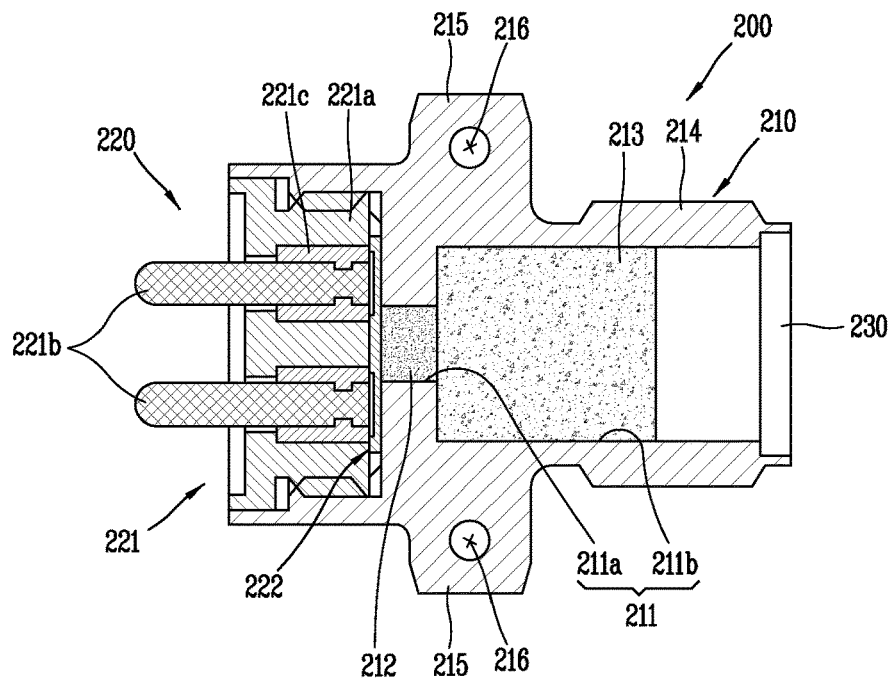
FIGS. 2A and 2B are conceptual diagrams for explaining a high voltage initiator mounted on a housing.
Figure 2B:
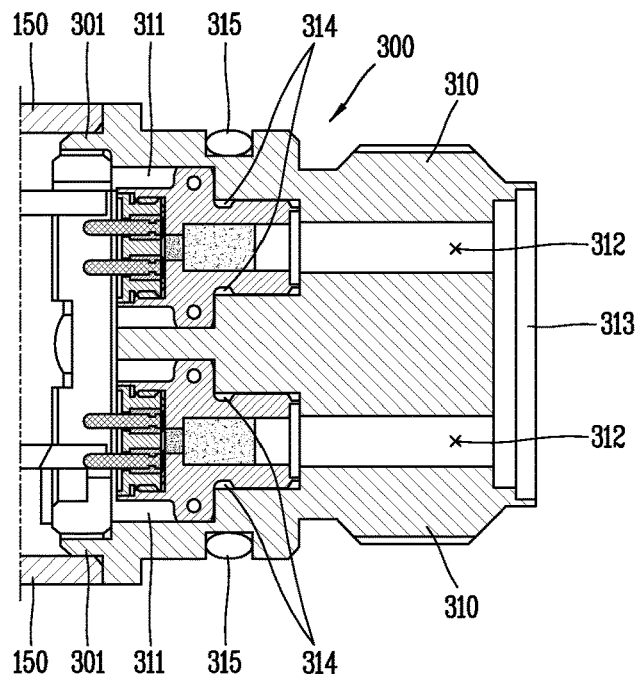

FIGS. 2A and 2B are conceptual diagrams for explaining a high voltage initiator mounted on a housing.

Referring to FIG. 2A, the configuration of a high voltage initiator 200 will be described.

The high voltage initiator 200 for a rocket motor according to the present invention includes a sleeve assembly 210 and an ignition assembly 220. The sleeve assembly 210 receives gunpowder through which energy for ignition is generated and maintains the sealed structure even after the detonation action of the gunpowder. Then, the sleeve assembly 210 functions to receive electrical energy to ignite the gunpowder received in the sleeve assembly 210.

Since the housing 310 according to this embodiment is not affected by the explosion pressure of the high voltage initiator 200, it may be made of a light material such as aluminum (Al).

First, the sleeve assembly 210 is configured to form a hollow part 211. As shown in FIGS. 1 and 2, the sleeve assembly 210 has a cylindrical shape extending in one direction (e.g., the left and right directions in FIGS. 1 and 2). The hollow part 211 formed in the sleeve assembly 210 may extend in one direction to open both ends thereof and may have a shape in which a plurality of cylindrical spaces are concentrically connected.

For secondary fixing of the sleeve assembly 210 and the housing 310, the sleeve assembly 210 of the present invention may include a wire reception part 216. The wire reception part 216 may be formed of at least one hole penetrating a fastener coupling part 115 in one direction. After the sleeve assembly 210 and the rocket motor are coupled to each other through the fastening screw part, a lock wire may be inserted into the wire reception part 216 to perform secondary fixing. Like the wire reception part 216, a structure capable of receiving or fixing the lock wire may be formed at the rocket motor.

Meanwhile, the ignition assembly 220 includes a plug part 221 and a foil initiation part 222.

The plug part 221 functions as an electrical connection part for delivering electrical energy to the rocket motor initiator 200 according to the present invention. The plug part 221 is mounted on the sleeve assembly 210 to close the one end part of the hollow part 211. Then, the foil initiation part 222 is mounted on the inner surface of the plug part 221 and is disposed adjacent to the hollow part 211. The foil initiation part 222 may be a portion operated by the mechanism of a Low Energy Exploding Foil Initiator (LEEFI) in the rocket motor initiator 200 according to the present invention. That is, when the foil initiation part 222 is applied with a high voltage of approximately 1000 V from the plug part 221, a bridge formed for narrowing the cross-sectional area of a wire on the foil structure may be vaporized and plasmaized by heat generation. At this time, a poly-imide film formed adjacent to the bridge is scattered together, so that the ignition action may be performed.

In the rocket motor initiator 200 according to the present invention, the sleeve assembly 210 includes first and second gunpowders 212 and 213, and they are installed adjacent to each other, so that a simple structure may be realized. The first gunpowder 212 is received in the hollow part 211 to be adjacent the foil initiation part 222. As shown in FIG. 2A, the first gunpowder 212 may be received in a first hollow 211a having a relatively small inner diameter and a cylindrical space adjacent to the foil initiation part 222 in the hollow part 211. The first gunpowder 212 may be made of a high explosive such as Hexanitrostilbene (HNS)-IV and may be detonated by a piece of polyimide film scattered with plasma. This first gunpowder 212 may be set to an amount that prevents structural damage to the sleeve assembly 210 at the time of detonation.

The second gunpowder 213 is received in the hollow part 211 so as to contact the first gunpowder 212.

The second gunpowder 213 may be filled in a second hollow 211b, which is adjacent to the first hollow 211a in the hollow part 211 and is a cylindrical space with a relatively larger inner diameter than the first hollow 211a.

The second gunpowder 213 may be made of, for example, BKNO3. The second gunpowder 213 is deflagrated or combusted by detonation of the first gunpowder 212. In particular, since the energy due to the detonation of the first gunpowder 212 is directly received and reaction occurs, the ignition energy may be supplied to a rocket motor.

On the other hand, the other end part of the hollow part 211 may be closed by a sleeve cap 230. The sleeve cap 230 may be welded to the sleeve assembly 210 to seal the hollow part 211. In particular, the sleeve cap 230 seals the second gunpowder 213 filled in the second hollow 211b from the outside, thereby preventing performance deterioration due to moisture infiltration. The air tightness inside the hollow part 211 by the sleeve cap 230 may be provided to maintain 10-6 He/cc.

As the first gunpowder 212 and the second gunpowder 213 are formed to be in contact with each other, the rocket motor initiator 200 according to the present invention may be simply configured with the hollow part 211 where the structure of the sleeve assembly 210 communicates with one space. Further, it is not necessary to separately provide a structure such as a metal case for separating the first gunpowder 212 and the second gunpowder 213 from each other. Therefore, the present invention may be configured concisely with a small number of parts, so that assembly convenience may be improved. Furthermore, there is an advantage that a smaller size initiator may be manufactured easily.

The ignition assembly 220 includes a plug part 221 and a foil initiation part 222. The plug part 221 may include a plug body 221a configured to be inserted into the sleeve assembly 210, and a plurality of pins 221b penetrating the plug body 221a.

The plug body 221a may be screw-coupled to a portion of the inner circumferential surface of the hollow part 211 to seal one side of the hollow part 211. In addition, after being screw-coupled, the plug body 221a and the sleeve assembly 210 are welded together to ensure additional sealing. Specifically, the outer circumferential surface end part of the plug body 221a shown in FIG. 1 and the inner circumferential surface end part of the hollow part 211 may be welded (w) to each other in order for sealing.

The pin 221b is a component for applying a voltage to the foil initiation part 222. The pin 221b is a structure constituting an electrode, and two pins 221b may be arranged in parallel so as to penetrate the plug body 221a.

The plug part 221 constituting the ignition assembly 220 may further include a sealing member 221c serving to perform insulation and sealing between the pin 221b and the plug body 221a.

The sealing member 221c may be made of an insulating glass material for electrical insulation. Then, a plurality of beads made of insulating glass are heated and melted while being inserted into a reception groove so that an annular protrusion part is formed and integrally formed with the cylindrical sealing member 221c. As a result, the air tightness maintenance of a combustion chamber after the ignition may be ensured with accurate transmission of an electric signal.

Referring to FIG. 2B, the initiation part 300 includes at least one high voltage initiator 200 received in the housing 310. The housing 310 includes at least one reception area 311, and the high voltage initiator 200 is fixed at the at least one reception area 311. The reception area 311 is formed as being recessed from the outer surface of the one end part of the housing 310. When a plurality of reception areas are formed, the reception areas do not communicate with each other.

An O-ring 314 is inserted between the high voltage initiator 200 and the housing 310 forming the reception area 311. Referring again to FIG. 2A, a recess area for mounting the O-ring 314 is formed on the outer surface of the high voltage initiator 200. The air tightness is maintained by the O-ring 314, so that the ignition circuit part 100 may be prevented from the inflow of combusted combustibles.

The pin 221b is disposed toward the ignition circuit part 100 and is electrically connected to the circuit board. The housing 310 includes an inner hole 312 formed corresponding to the hollow part 211. The inner hole 312 is covered by the cover part 313. The fluid combusted in the inner hole 312 may stay and be discharged.

The ignition circuit part 100 and the initiation part 300 are electrically connected by the plurality of pins 221b. That is, an area where the high voltage initiator 200, particularly the ignition assembly 220, is formed is sealed. Therefore, the ignition circuit part 100 does not need a special structure for receiving the high voltage initiator 200, and since the initiation part 300 is separable from the ignition circuit part 100, the initiation part 300 may be implemented in various shapes. Also, since the initiation part 300 according to this embodiment does not require an additional external body, it may be repeatedly used.

A fixing member 315 may be formed on the outer circumference of the housing 310. The air tightness is maintained by the fixing member 315, so that the ignition circuit part 100 may be prevented from the inflow of combusted combustibles.

When a plurality of high voltage initiators 200 are mounted on the housing 310, one high voltage initiator 200 may be selectively ignited. Since the ignition circuit part 100 and the housing 310 are not damaged even after the high voltage initiator 200 is ignited, the performance of the ignition circuit part 100 may be checked even after ignition. Therefore, when a problem occurs, the cause may be identified quickly, and an accurate feedback on the problem may be provided.

Since a partition between the ignition safety device 1000 for a rocket motor according to the present invention, the ignition circuit part 100, and the initiation part 300 is unnecessary, the ignition safety device 1000 may be further downsized and designed with spatial flexibility.

Figure 3:
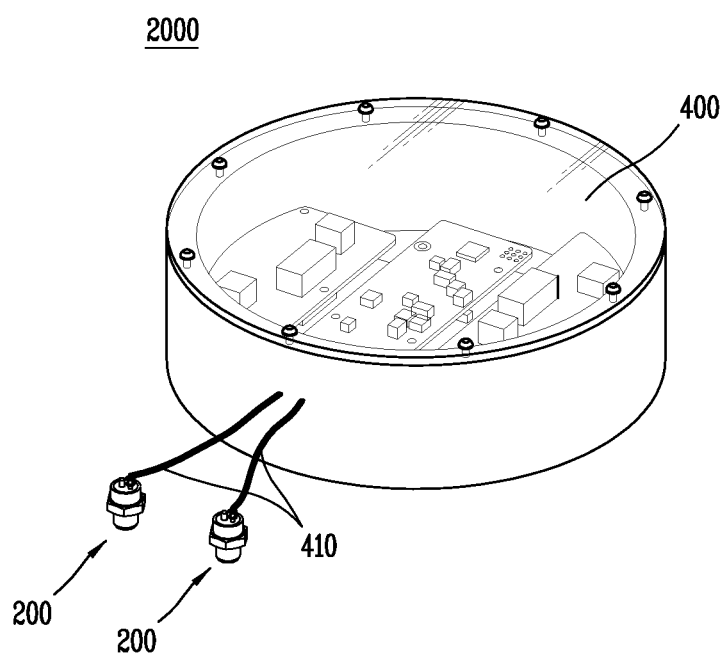
FIG. 3 is a conceptual diagram for explaining an ignition safety device according to another embodiment.

FIG. 3 is a conceptual diagram for explaining an ignition safety device according to another embodiment.

An ignition safety device 1000 according to this embodiment includes a structurally-separated ignition circuit part 400 and high voltage initiator 200. The high voltage initiator 200 and the ignition circuit part 400 are connected by an electric wire 410, and the high voltage initiator 200 is implemented not to be mounted in the ignition circuit part 400.

The high voltage initiator 200 according to this embodiment does not require the housing 310 according to the embodiment of FIG. 2.

That is, the ignition circuit part 400 and the high voltage initiator 200 are connected by an electric wire, but they are formed as independent modules.

Accordingly, the ignition safety device according to the present invention may be applied to a multi-stage pulse motor propulsion engine or a system such as a DACS, a side thruster, and a satellite, which require multiple ignition.

The above-described electromechanical ignition safety device is not limited to the application of the configurations and methods of the above-described embodiments and the entire or part of the embodiments may be selectively combined and configured to allow various modifications.

According to the present invention, the ignition safety device may prevent the electronic circuit part from being damaged by the LEEFI even after ignition. Through this, the performance of the electronic circuit part after ignition may be checked. Faster and more precise feedback may be provided during the development of missile in addition to the development of ignition safety devices, and when a problem occurs, the cause may be identified quickly.

Since the explosion pressure generated by the EFI ignition is held by the high voltage initiator, the ignition safety device housing may be lightweight by applying a light material.

Since the high voltage initiator is separated, an existing ignition safety device may be further miniaturized and designed with spatial flexibility. Since the opposite side of the ignition output part of the high voltage initiator is structurally sealed, this is applied to a multi-stage pulse motor propulsion engine or a system such as a DACS, a side thruster, and a satellite, which require multiple ignition, so that space utilization may be greatly improved.

In the case of existing ignition safety devices, the initiation part may not be replaced and is disposable. Compared to this, the ignition safety device according to the present invention may replace only the initiation part and use it repeatedly, thereby saving development and testing costs.

What is claimed is:

1. An ignition safety device for a rocket motor, the ignition safety device comprising:
   an ignition circuit part comprising a main body and a control unit configured to generate an initiation signal on the basis of a predetermined signal and configured to be accommodated in the main body; and
   an initiation part mounted at one end of the ignition circuit part and comprising a plurality of high voltage initiators electrically connected to the ignition circuit part,
   wherein the plurality of high voltage initiators each comprise a sleeve assembly that houses a gunpowder therein and forms a body of a high voltage igniter and an explosion assembly configured to ignite the gunpowder by the initiation signal,
   wherein the initiation part comprises a housing having a plurality of reception spaces for receiving the plurality of high voltage initiators, respectively,
   wherein the housing is coupled at one end of the main body, wherein the high voltage initiators are received at one end of the housing coupled to the main body, and wherein the housing further comprises a plurality of inner holes corresponding to the high voltage initiators, respectively.

2. The ignition safety device of claim 1, further comprising an O-ring inserted between the high voltage initiators and the reception space of the housing to prevent fluid movement, wherein a recess area for inserting the O-ring is disposed at an outer surface of the high voltage initiator.

3. The ignition safety device of claim 1, wherein the plurality of reception spaces are disposed apart from each other to separately store the plurality of high voltage initiators.

4. The ignition safety device of claim 1, wherein the housing is formed of aluminum (Al).

\* \* \* \* \*